July 21, 1959  E. A. TYCZKOWSKI  2,895,999
PRODUCTION OF CARBON TETRAFLUORIDE
Filed Dec. 1, 1955
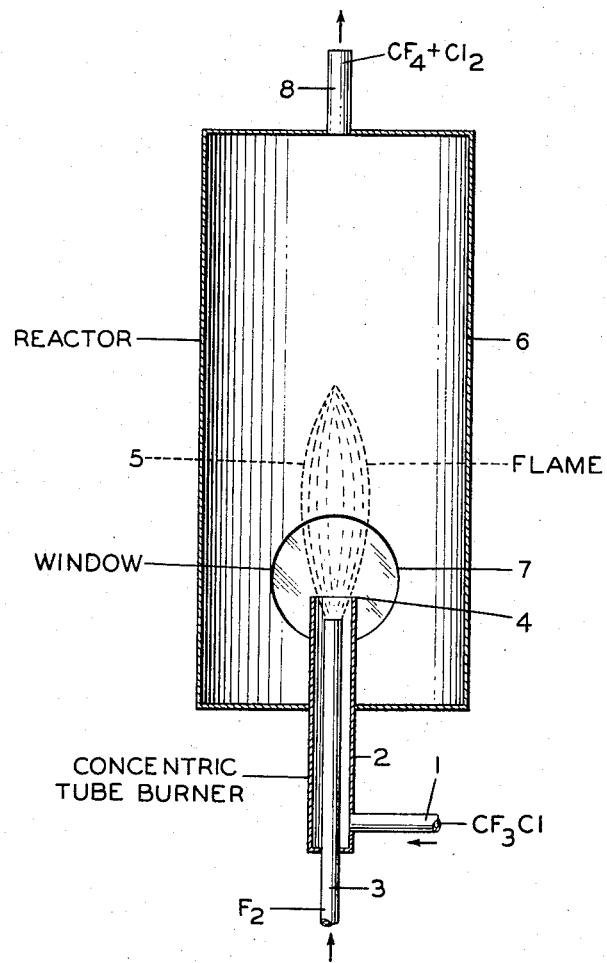
INVENTOR
EDWARD A. TYCZKOWSKI
BY Ernest A. Polin
ATTORNEY

# 2,895,999

PRODUCTION OF CARBON TETRAFLUORIDE

Edward A. Tyczkowski, Rockaway, N.J., assignor to Allied Chemical Corporation, a corporation of New York Application December 1, 1955, Serial No. 550,374

3 Claims. (Cl. 260—653.8)

This invention relates to a new process for the production of carbon tetrafluoride. More particularly, the invention relates to the production of carbon tetrafluoride by reaction of trifluorochloromethane or difluorodichloromethane with elementary fluorine.

Carbon tetrafluoride is a stable compound which finds utility as a low temperature refrigerant, as a gaseous dielectric and as an inert gas. Carbon tetrafluoride has been prepared by heating carbon and a catalyst in a stream of fluorine to produce carbon tetrafluoride along with several other fluorocarbons. It has also been produced by burning fluorine in refluxing carbon tetrachloride vapors containing iodine or arsenic as a catalyst. The products of this reaction comprise carbon tetrafluoride, trifluorochloromethane, difluorodichloromethane and fluorotrichloromethane.

A practical difficulty associated with the reaction of organic compounds with elementary fluorine has been the fact that there is usually obtained a complex product which contains a large number of compounds. Since the reaction involves atomic chain mechanisms, the free radicals present have caused appreciable polymerization to tarry materials and to compounds containing more carbon atoms than the starting compound. Accordingly, in the case of organic reactants containing a single carbon atom, carbon structures have been formed which range from one carbon atom up to unstable tars.

An object of the present invention is to provide a simple and economical process for producing high yields of carbon tetrafluoride.

Another object of the present invention is to provide a simple and economical process for producing high yields of carbon tetrafluoride by reacting trifluorochloromethane or difluorodichloromethane with elementary fluorine.

Other objects and advantages of the present invention will appear in the following description and examples.

I have found that the above objects may be realized by igniting a member of the group consisting of trifluorochloromethane and difluorodichloromethane with elementary fluorine to form a self-sustaining flame, maintaining said flame by continuous addition of the reactants and recovering carbon tetrafluoride from the resulting reaction products.

When trifluorochloromethane is employed as the raw material in the present invention, the basic reaction may be represented by the following equation:

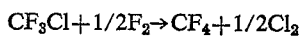

$$CF_3Cl + 1/2F_2 \rightarrow CF_4 + 1/2Cl_2$$

When the raw material of the present invention comprises difluorodichloromethane, the basic reaction may be represented by the following equation:

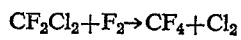

$$CF_2Cl_2 + F_2 \rightarrow CF_4 + Cl_2$$

Each of the aforementioned reactions produces a relatively simple mixture from which high yields of substantially pure carbon tetrafluoride may be recovered by conventional procedures.

The preferred organic reactant of the present invention is trifluorochloromethane rather than difluorodichloromethane since it requires only one-half as much fluorine to make the same amount of carbon tetrafluoride. This is of commercial importance since fluorine is the more expensive reactant. Further, the flame resulting from use of trifluorochloromethane is smaller than that resulting from use of difluorodichloromethane, and hence, the apparatus containing it can be constructed on a smaller scale. In addition, by using trifluorochloromethane as the reactant, the flame produced is cooler so that soot does not form and there is less heat to be removed. Also, trifluorochloromethane is much less reactive than difluorodichloromethane; hence, the explosion hazard is substantially diminished. Finally, in the case of the trifluorochloromethane reactant, there is only one-half as much waste chlorine to be disposed of.

Referring to the accompanying drawing, the present invention will be described in more detail with reference to use of trifluorochloromethane as reactant.

Trifluorochloromethane enters through outer port 1 of a concentric tube burner 2. Elementary fluorine enters burner 2 through center port 3. The reactants are lighted at mouth 4 of burner 2 by use of any suitable means, e.g. a match or gas flame. In commercial practice of the present invention, it would be desirable to install a spark plug in the burner for the purpose of lighting the reactants.

In order to prevent blow-off of the flame, the port velocity of the reactants must be lower than the flame speed. Also, the ports must be positioned to give a well-defined flame cone. The flame should be steady and stable with a complete cone, and there should be no soot formed. When trifluorochloromethane is employed as reactant, the best flame is formed with the organic material in the outer port and fluorine in the center port. Using difluorodichloromethane as reactant, the best flame is formed with the reactants transposed. In either case, the outer port should extend somewhat beyond the inner one for best operation.

Since fluorine is the more expensive reactant, the reaction should be run with an excess of the organic reactant, e.g. about 10 to 20%, to be sure to use as much of the fluorine reactant as possible.

The burner is mounted in a metal reactor 6 which may suitably be made of nickel. Reactor 6 is so constructed as to shield the flame from the atmosphere. In order to observe the flame during the reaction and determine that it is operating correctly, a window 7 is provided in the side of reactor 6. This window should be constructed of a material which is transparent, fairly inert to fluorine and has a high melting point. Although glass coated with Fluorolube (polymeric trifluorochloroethylene) or Lucite (thermoplastic methyl methacrylate resin) may be used as window material, Kel–F (trifluorochloroethylene resin) has been found particularly suitable.

The flame produced by ignition of the reactants is self-sustaining and requires no extraneous heat for its maintenance. The flame is maintained for any desired period of time by continuous feeding of the reactants. The gaseous reaction products containing carbon tetrafluoride are withdrawn from the top of reactor 6 through line 8. Substantially pure carbon tetrafluoride is then recovered from the reaction products by conventional methods.

When trifluorochloromethane is employed as reactant, the reaction products usually comprise carbon tetrafluoride, chlorine, unreacted trifluorochloromethane and traces of fluorine and/or chlorine fluorides. The reaction products may first be passed through a rock salt tower to remove the fluorine and/or chlorine fluorides, scrubbed with an alkali solution, e.g. a 5 to 10% NaOH solution, to remove chlorine and then condensed in cold traps. Finally, the product is distilled to recover carbon tetrafluoride in substantially pure form. In the case of the difluorodichloromethane reactant, the reaction products usually comprise carbon tetrafluoride, chlorine, trifluorochloromethane, unreacted difluorodichloromethane and traces of fluorine and/or chlorine trifluorides. These reaction products may be subjected to the aforementioned rock salt, alkali, condensation and distillation treatments to produce substantially pure carbon tetrafluoride.

Trifluorochloromethane and difluorodichloromethane, separated during the distillation of either of the aforementioned reaction products may be recycled to the concentric tube burner to form additional carbon tetrafluoride.

The present process for the production of carbon tetrafluoride possesses many advantages over processes known to the art. First, the process is extremely simple and, therefore, economical in operation, and yet produces yields of substantially pure carbon tetrafluoride which are essentially 100%. Since only 1 or 2 atoms of elementary fluorine are required for each molecule of carbon tetrafluoride, the process is extremely economical with respect to raw materials. Another economic advantage resides in the fact that the reaction supplies its own heat, no extraneous heat being necessary. Further, since no catalyst is used in the process, it not only eliminates an expense but also avoids product contamination which often results from use of catalysts. Finally, there are no inert gases such as oxygen or nitrogen present in the process which would be extremely difficult to separate from the desired carbon tetrafluoride product.

The present invention may be illustrated by the following examples.

*Example 1.*—Difluorodichloromethane was introduced through center port 3 to concentric tube burner 2, and elementary fluorine was introduced to burner 2 through outer port 1. The reactants were ignited by a match, and the resulting flame was maintained by constant flows of the reactants: 2.55 mols of fluorine per hour and 2.81 mols of difluorodichloromethane per hour. The product gases evolving through line 8 were passed through a tower containing rock salt to remove traces of fluorine and chlorine fluorides, were scrubbed with a 20% NaOH solution, to remove chlorine and were then condensed in cold traps (−192° C.). The product was distilled to recover substantially pure carbon tetrafluoride. Carbon tetrafluoride and trifluorochloromethane were obtained in conversions of 80% to 17%, respectively (in terms of the mols theoretically obtainable from the mols of difluorodichloromethane fed). 5% of the difluorodichloromethane remained unreacted. Since the trifluorochloromethane and difluorodichloromethane could be recycled to the burner for additional reaction, the ultimate yield approximated 100%.

*Example 2.*—The same apparatus used in Example 1 was employed in burning trifluorochloromethane with fluorine in a self-sustaining flame. In this example, center port 3 was used for the elementary fluorine and outer port 1 was used for the trifluorochloromethane. Constant flow rates were maintained: 1.0 mol of fluorine per hour and 2.31 mols of trifluorochloromethane per hour. The reaction products were purified and distilled as in Example 1 to recover substantially pure carbon tetrafluoride. A 67% conversion to carbon tetrafluoride was obtained with 33% of the trifluorochloromethane remaining unreacted. The ultimate yield of carbon tetrafluoride approximated 100%.

Since various changes and modifications may be made in the present invention without departing from the spirit thereof, the invention is to be taken as limited only by the scope of the appended claims.

I claim:
1. A process for the production of carbon tetrafluoride which comprises igniting reactants comprising (1) a member of the group consisting of trifluorochloromethane and difluorodichloromethane, in stoichiometric excess, and (2) elementary fluorine, said reactants constituting the sole reaction medium to form a self-sustaining flame, maintaining said flame by continuous addition of the reactants and recovering carbon tetrafluoride from the resulting reaction products.

2. A process for the production of carbon tetrafluoride which comprises igniting reactants comprising trifluorochloromethane, in stoichiometric excess, and elementary fluorine, said reactants constituting the sole reaction medium to form a self-sustaining flame, maintaining said flame by continuous addition of the reactants and recovering carbon tetrafluoride from the resulting reaction products.

3. A process for the production of carbon tetrafluoride which comprises igniting reactants comprising difluorodichloromethane, in stoichiometric excess, and elementary fluorine, said reactants constituting the sole reaction medium to form a self-sustaining flame, maintaining said flame by continuous addition of the reactants and recovering carbon tetrafluoride from the resulting reaction products.

References Cited in the file of this patent
UNITED STATES PATENTS

| | | |
|---|---|---|
| 2,013,050 | Henne | Sept. 3, 1935 |
| 2,538,723 | Fruhwirth et al. | Jan. 16, 1951 |

OTHER REFERENCES

Ruff et al.: Berichte, vol. 69, pages 299–308 (1936), only page 303 needed.

Bigelow: Chemical Reviews, vol. 40, pp. 51–115 (1947) (pages 59, 60, 78 and 79 relied on).